United States Patent Office 3,778,451
Patented Dec. 11, 1973

3,778,451
PROCESS FOR THE MANUFACTURE OF
PROPYLENE OXIDE
Michel Poite, Paris, France, assignor to
Naphtachimie, Paris, France
No Drawing. Continuation of abandoned application Ser.
No. 679,170, Oct. 30, 1967. This application Dec. 7,
1970, Ser. No. 95,956
Int. Cl. C07d 1/08, 1/12
U.S. Cl. 260—348.5 L                    2 Claims

ABSTRACT OF THE DISCLOSURE

A process for the manufacture of organic epoxides by the reaction of hydrogen peroxide in an organic solvent medium with an organic compound having at least one ethylenic double bond, in the presence of a transition compound of a metal selected from the group consisting of molybdenum, tungsten, vanadium, niobium, tantalum, uranium and rhenium, said compound being soluble in the reaction medium, and in the presence of a nitrogenous organic compound which is soluble in the reaction medium and in which the amount of water present in the reaction medium at the end of the reaction is less than 20% by weight.

---

This application is a continuation of application Ser. No. 679,170, filed Oct. 30, 1967, and now abandoned.

This present invention relates to the manufacture of epoxides by liquid-phase oxidation of organic compounds which possess at least one ethylenic double bond.

The epoxides, which contain the functional group

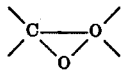

are products of commercial importance. In particular, these epoxides can be utilized in the manufacture of certain polymers, such as polyoxyethylene or polyoxypropylene or can be utilized for the preparation of the corresponding glycols or glycol derivatives.

Epoxides have been prepared of compounds which possess an ethylenic double bond characterized by the functional group $>C=C<$. In particular, compounds which possess an ethylenic double bond have been treated with chlorine water to obtain the group

The chlorohydrin thus prepared is reacted with lime to form the epoxide, calcium chloride, and water. This process has the drawback of necessitating the use of such large quantities of chlorine as to raise the cost of the epoxide. However, this chlorine is converted to calcium chloride which is of little value as a by-product and which poses difficult problems of removal.

It is also known to manufacture epoxides by reaction of hydrogen peroxide with ethylenic compounds in the presence of certain catalysts, such as inorganic peroxy acids.

According to certain of these processes, as described in French Pat. No. 1,201,458 of the Columbia Southern Chemical Corp., the reaction is carried out in an aqueous medium. This limits the process to the epoxidation of water soluble olefinic compounds, such as the ethylenic alcohols, and suffers from the disadvantage of promoting the formation of hydroxylated products which diminishes the epoxide yield.

According to other processes, described in French Pat. No. 1,107,517 to N. V. de Bataafiche Petroleum Kaatschappij, the reaction is carried out in the presence of organic solvents and in the presence of as little water as possible, however. The epoxide yields are generally low except when stable epoxides are formed, such as in the case of the epoxidation of certain halogenated polycyclic ethylenic compounds.

Applicant has found that it was possible to obtain good yields of epoxides by reacting hydrogen peroxide and ethylenic compounds in an organic solvent medium, even when the epoxides formed are not very stable, provided that the reaction is carried out in the presence of certain dissolved transition metal compounds and in the presence of a nitrogenous organic base dissolved in the reaction medium.

Thus, it is an object of this invention to provide a new and improved process for the manufacture of epoxides and it is a related object to provide a process of the type described which makes use of an organic solvent medium in which hydrogen peroxide is reacted with a compound possessing at least one ethylenic double bond in the presence of a transition compound of a metal such as molybdenum, tungsten, vanadium, niobium, tantalum, uranium, and rhenium, which compound is soluble in the reaction medium, and in which there is also present a nitrogenous organic base which is likewise soluble in the reaction medium and in which the proportion of water present in the reaction medium at the end of the operation is less than 20% by weight, and it is a further object to produce new and novel epoxides and epoxide compositions prepared by the above-quoted process.

In accordance with the practice of this invention, the compound used as the compound possessing at least one ethylenic double bond can be an ethylenic hydrocarbon, such as ethylene, propylene, a butene, 1-octene; or a polyethylenic hydrocarbon, such as butadiene or isoprene; or a cycloalkene, such as cyclohexene; or an aromatic hydrocarbon having an ethylenic side chain, such as styrene.

It is likewise possible to practice the invention by starting with substances which possess at least one ethylenic double bond and which are not reactive with hydrogen peroxide, in particular, as by starting with ethylenic alcohols or their derivatives, such as allyl alcohol and allyl chloride, or by starting with unsaturated oils or fats.

The organic solvent used is preferably selected of an organic substance having a polar nature sufficient to obtain a homogeneous mixture with the compounds to be epoxidated and hydrogen peroxide. The alcohols, preferably the secondary alcohols, such as isopropanol and secondary butanol, are especially suitable for this purpose. It is likewise possible to use as solvents glycols, esters, linear or cyclic ethers, and certain weak carboxylic acids.

The epoxidation reaction leads to the formation of water which tends to promote the production of undesirable glycols. As a result, it is desirable to make use of very concentrated hydrogen peroxide which advantageously contains less than 10% water and preferably, less than 1% water.

The applicant has likewise found that it is possible to obtain good epoxide yields when the quantity of hydrogen peroxide used is between about 5% and 40% by weight of the organic solvent employed and when the molar ratio of the quantity of compound possessing at least one ethylenic double bond to the quantity of hydrogen peroxide used is within the range of 1 to 1–5, and preferably between 1 and 2.

When isopropanol is employed as the solvent, it is of particular advantage to utilize solutions of hydrogen peroxide in isopropanol obtained by oxidizing isopropanol with oxygen. Then, it is sufficient to distill, at least partially, the acetone which has been simultaneously formed during this oxidation. Use is made of the solution of hydrogen peroxide in isopropanol prepared in this manner.

Various of the compounds of the transition metals of molybdenum, tungsten, vanadium, niobium, tantalum, uranium, or rhenium can be utilized as long as they are soluble in the reaction medium, such as, for example, anhydrides, acids, heteropoly acids, organic esters, and complexes like acetylacetonates. The transition metal compound is employed in the reaction mixture in an amount within the range of 0.001 and 1 gram-atom transition metal per liter.

Excellent results can be obtained by the use of molybdenum compounds derived from molybdenum anhydride (molybdenum trioxide), such as the hydrates of molybdenum anhydride, the molybdic acid of Graham and Murgier, the esters of molybdic acid, such as propylene glycol molybdate, molybdenum complexes, such as that with acetylacetone, heteropoly acids of molybdenum, such as the phosphomolybdic acids, or mixtures of these compounds.

As the nitrogenous organic base, use can be made of quaternary ammonium oxides, such, for example, as tetramethyl-ammonium hydroxide, methyltriethylammonium hydroxide, tetrabutylammonium hydroxide, dodecyltrimethylammonium hydroxide; tertiary amines, such as triethylamine, 2-diethylaminoethanol, 4-morpholineethanol, 1-piperidineethanol, oxides of these amines or mixtures of these compounds.

Applicant has found that the presence of such nitrogenous organic bases makes it possible to obtain high epoxide conversion rates without causing precipitation of the transition metal compound. In the absence of these bases, the substances to be epoxidized are especially converted to glycols or glycol derivatives. Furthermore, applicant has found that in order to obtain satisfactory yields of epoxides, it is sufficient if the amount of nitrogenous organic base introduced into the reaction mixture is in the molar ratio of base-transition metal within the range of 1 to .5–2.

According to a preferred mode of carrying out the invention, a solution of hydrogen peroxide in the organic solvent is first prepared. The transition metal compound dispersed in approximately the same weight of water is then introduced. The nitrogenous organic base is introduced into the solution obtained and then the substance to be epoxidized.

In a particular situation, the ethylenic compound can play the role of solvent, i.e., in the case of epoxidation of a compound which, at the same time, carries an ethylenic double bond and another functional group capable of promoting solution of the catalytic system, such as an alcohol or ester function. In such instance, it is not profitable to make use of another solvent. Therefore, one begins with solution of the transition metal compound in the compound to be epoxidized and thereafter the nitrogenous organic base and the hydrogen peroxide are introduced.

The reaction medium is maintained at such a temperature to maintain the epoxidation reaction at a desirable rate without, however, being accompanied by the formation of considerable quantities of by-products, such as glycols, aldehydes, ketones, or acids. From a practical standpoint, it is desirable to operate at a temperature within the range of 0 and 80° C., preferably 20° and 60° C., under a pressure sufficient to maintain the reaction medium in the liquid phase. The reaction is often less than 5 hours and most frequently, within the range of 2 to 3 hours.

During the epoxidation reaction, consumption of hydrogen peroxide results in the formation of water. This water will be added to that which may already be present in the reagents employed. It is desirable that the total quantity of water present in the reaction medium at the end of the operation is maintained below 20% by weight to avoid or minimize the formation of glycols. Most often, when the water at the end of the operation is maintained so as not to exceed 10–12% by weight, no difficulties are experienced.

It is then possible to separate the epoxide from the reaction mixture as by distilling off the volatile compounds followed by rectification of the epoxide.

It becomes possible, by the practice of this invention, to manufacture epoxides in a single step reaction and to obtain such epoxide in high yields based on the substances to be epoxidized as well as the hydrogen peroxide which has entered into the reaction.

Other characteristics and advantages of the invention become evident from the following examples which are given by way of illustration, and not by way of limitation:

EXAMPLE 1

20.2 g. propylene glycol molybdate, $MoO_3 \cdot C_3H_6O$, previously dispersed in an equal amount of water are dissolved in a liter of an isopropanol solution of a 20% by weight hydrogen peroxide solution. 11.7 g. triethylamine oxide are added. 10 ml. of the resulting solution to which 3 g. propylene are added are introduced into a 35 ml. tube. The ampoule is sealed and maintained at +10° C. for 3 hours. The ampoule is cooled to −80° C. and then opened, and at −40° C., the unreacted propylene is emitted. The hydrogen peroxide remaining is determined by means of ceric sulfate, and the organic substances are separated by gas chromatography. A conversion rate of 50% for hydrogen peroxide is obtained as well as a propylene oxide yield and an acetone yield of 71% and 14%, respectively, based on hydrogen peroxide consumed.

EXAMPLE 2

Example 1 is repeated, but with different reaction temperatures of +40° C., 46° C., 52° C., and 56° C. After a reaction time of two hours, the ampoules are opened at −80° C., propylene which has not reacted is degassed at −40° C., the remaining hydrogen peroxide is determined, and the organic substances are separated by gas chromatography. One obtains the following propylene oxide yields based on the hydrogen peroxide consumed: at 40° C.: 76%; at 46° C.: 41%; at 52° C.: 23%; at 56° C.: 3%.

EXAMPLE 3

Two comparison tests are conducted under the same conditions as in Example 1, except that in one test triethylamide oxide is omitted. After three hours at +40° C., the ampoule is opened at −80° C., and the propylene which has not reacted is degassed at −40° C. The content of the ampoule is analyzed for propylene oxide and acetone by gaseous chromatography, and hydrogen peroxide is potentiometrically determined in the presence of ceric sulfate.

When, in both cases, the conversion rate of hydrogen peroxide is 50%, a propylene oxide yield of 72% is obtained in the test conducted in the presence of triethylamine oxide and a yield of zero is obtained in the other test. The acetone yield is 10% in both cases. All such yields are calculated on hydrogen peroxide consumed.

EXAMPLE 4

Three comparison tests are conducted under the same conditions as in Example 1, except that the amount of water in admixture with the isopropanol solvent is 10, 20, and 50% by volume, respectively.

After two hours at 40° C., the reaction products are analyzed. In the three tests, the acetone yield, determined as in the preceding examples, is between 10% and 14%. The epoxide yield, expressed as the weight ratio propylene oxide/acetone and listed in the tabulation below, rapidly decreases when the water content of the reaction medium increases:

| Water in the solvent percent by volume: | Propylene oxide/acetone weight ratio |
|---|---|
| 10 | 5.21 |
| 20 | 2.30 |
| 50 | 0.85 |

For comparison, a fourth test is conducted under the same operating conditions except that pure water is used as the solvent. Under such conditions only negligible quantities of propylene oxide and acetone are obtained.

EXAMPLE 5

The procedure of Example 1 is followed except that only 2.02 g. propylene glycol molybdate are dissolved in one liter of the 20% solution of hydrogen peroxide in isopropanol and that, instead of introducing triethylamine oxide into this solution, 20 ml. of a 0.5 N solution of tetrabutylammonium hydroxide in isopropanol are introduced. The conversion rate of hydrogen peroxide is 9%; the yields are 66% propylene oxide and 28% acetone based on hydrogen peroxide consumed.

EXAMPLE 6

This example is concerned with the separation of propylene oxide from an isopropanol solution prepared as in Example 1; however, the example is carried out with ten times larger quantities of products. The propylene which has not reacted is first removed by degassing at —40° C. This propylene entrains about 1 g. propylene oxide which is separated by bubbling the gaseous mixture through water since propylene is relatively insoluble in water. The solution remaining after the degassing of propylene is transferred to a dropping funnel and introduced dropwise into a column packed with glass helices, heated to 70° C. and through which a slight current of nitrogen is circulated. The vapors leaving the column are cooled and then trapped at —80° C. These condensed vapors, which contain 4 g. propylene oxide, acetone, and isopropanol, are fractionally distilled in a spinning band column and 3.5 g. propylene oxide are collected. The liquid fraction collected in the packed column consists of a solution of hydrogen peroxide in isopropanol. In addition, this solution contains 0.94 g. propylene oxide and the catalytic mixture and can be recycled to a subsequent operation.

EXAMPLE 7

The procedure of Example 1 is followed, except that isopropanol is replaced by different solvents. For these solvents, the following tabulation lists the conversion rates of hydrogen peroxide and the epoxide yield after three hours reaction time:

| Solvent | Conversion rate of $H_2O_2$, percent | Epoxide yield based on $H_2O_2$ consumed, percent |
|---|---|---|
| Isopropanol (Example 1) | 50 | 71 |
| Secondary butanol | 60 | 69 |
| Cyclohexanol | 35 | 29 |
| Methyl acetate | 41 | 47 |

It will be understood that changes may be made in the details of formulation and operation without departing from the spirit of the invention, especially as defined in the following claims.

What is claimed is:

1. A process for the manufacture of propylene oxide comprising reacting hydrogen peroxide in an organic solvent selected from the group consisting of isopropanol and secondary butanol, the hydrogen peroxide being employed in an amount within the range of 5 to 40% by weight of the organic solvent, with propylene in the presence of propylene glycol molybdate and a nitrogenous organic base selected from the group consisting of a quaternary ammonium hydroxide, a tertiary amine, a tertiary amine oxide, and mixtures thereof, present in an amount within the range of 1 mole of base to 0.5 to 2.0 moles of molybdenum, at a temperature within the range of 20° to 60° C., and in which the amount of water present in the reaction medium at the end of the reaction is maintained to less than 20% by weight.

2. A process as defined in claim 1 in which the concentration of the propylene glycol molybdate in the reaction medium is within the range of 0.001 to 1 gram atom per liter.

References Cited

UNITED STATES PATENTS

| 3,122,569 | 2/1964 | Kaman | 260—348.5 |
| 3,177,227 | 4/1965 | Payne | 260—343.6 |
| 3,293,269 | 12/1966 | Wolgemuth | 260—348.5 |
| 3,489,775 | 1/1970 | Seree de Roch et al. | 260—348.5 |

NORMA S. MILESTONE, Primary Examiner